(12) United States Patent
Bouldin et al.

(10) Patent No.: US 10,731,858 B2
(45) Date of Patent: Aug. 4, 2020

(54) CONTROLLED VARIATION OF PRESSURE DROP THROUGH EFFUSION COOLING IN A DOUBLE WALLED COMBUSTOR OF A GAS TURBINE ENGINE

(71) Applicant: United Technologies Corporation, Hartford, CT (US)

(72) Inventors: Lee E. Bouldin, Woodbridge, CT (US); Jonathan J. Eastwood, Newington, CT (US); Dennis M. Moura, South Windsor, CT (US); Monica Pacheco-Tougas, Waltham, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 602 days.

(21) Appl. No.: 14/913,795

(22) PCT Filed: Sep. 16, 2014

(86) PCT No.: PCT/US2014/055784
§ 371 (c)(1),
(2) Date: Feb. 23, 2016

(87) PCT Pub. No.: WO2015/039074
PCT Pub. Date: Mar. 19, 2015

(65) Prior Publication Data
US 2016/0356500 A1 Dec. 8, 2016

Related U.S. Application Data

(60) Provisional application No. 61/878,327, filed on Sep. 16, 2013.

(51) Int. Cl.
*F23R 3/00* (2006.01)
*F23R 3/06* (2006.01)
(Continued)

(52) U.S. Cl.
CPC .............. *F23R 3/06* (2013.01); *F23R 3/002* (2013.01); *F23R 3/04* (2013.01); *F23R 3/60* (2013.01);
(Continued)

(58) Field of Classification Search
CPC .... F23R 3/06; F23R 3/002; F23R 3/04; F23R 3/60; F23R 2900/03042;
(Continued)

(56) References Cited

U.S. PATENT DOCUMENTS 4,132,066 A * 1/1979 Austin, Jr. ............... F23R 3/06
60/752
4,653,279 A * 3/1987 Reynolds ................. F23R 3/06
60/755
(Continued)

OTHER PUBLICATIONS

Wikipedia, Orifice Plate, Mar. 7, 2011.*
(Continued)

*Primary Examiner* — Todd E Manahan
*Assistant Examiner* — Edwin Kang
(74) *Attorney, Agent, or Firm* — Getz Balich LLC (57) ABSTRACT

A combustor of a gas turbine engine includes a multiple of liner panels mounted to the support shell, at least one of the multiple of liner panels includes a first impingement cavity that operates at a first pressure and a second impingement cavity that operates at a second pressure different than the first pressure. A method of cooling a wall assembly within a combustor of a gas turbine engine includes directing air through a support shell and a liner panel that defines a first impingement cavity and a second impingement cavity. The first impingement cavity operates at a first pressure and the second impingement cavity operates at a second pressure that is different than the first pressure.

15 Claims, 11 Drawing Sheets

(51) Int. Cl.
*F23R 3/60* (2006.01)
*F23R 3/04* (2006.01)

(52) U.S. Cl.
CPC ............... *F23R 2900/03042* (2013.01); *F23R 2900/03044* (2013.01); *Y02T 50/675* (2013.01)

(58) Field of Classification Search
CPC .. F23R 2900/03044; F23R 2900/03041; F23R 2900/03043; F05D 2260/201; F05D 2260/203
See application file for complete search history.

(56) References Cited

U.S. PATENT DOCUMENTS

| | | | |
|---|---|---|---|
| 5,331,816 | A | 7/1994 | Able et al. |
| 5,533,864 | A * | 7/1996 | Nomoto .................. F01D 5/186 415/115 |
| 6,205,789 | B1 | 3/2001 | Patterson et al. |
| 6,408,628 | B1 | 6/2002 | Pidcock et al. |
| 6,470,685 | B2 | 10/2002 | Pidcock et al. |
| 6,901,757 | B2 | 6/2005 | Gerendas |
| 7,065,971 | B2 | 6/2006 | Bellucci et al. |
| 7,093,441 | B2 | 8/2006 | Burd et al. |
| 7,146,815 | B2 | 12/2006 | Burd |
| 7,363,763 | B2 | 4/2008 | Coughlan, III et al. |
| 7,849,694 | B2 | 12/2010 | Dahlke et al. |
| 7,954,325 | B2 | 6/2011 | Burd et al. |
| 8,015,829 | B2 | 9/2011 | Coughlan, III et al. |
| 8,113,004 | B2 | 2/2012 | Carlisle et al. |
| 8,256,224 | B2 | 9/2012 | Garry et al. |
| 2003/0182942 | A1 | 10/2003 | Gerendas |
| 2003/0200752 | A1 | 10/2003 | Moertle et al. |
| 2004/0006995 | A1 | 1/2004 | Snyder |
| 2004/0211188 | A1 | 10/2004 | Alkabie |
| 2005/0249583 | A1 | 11/2005 | Mongillo et al. |
| 2006/0059916 | A1 | 3/2006 | Cheung et al. |
| 2010/0095679 | A1 * | 4/2010 | Rudrapatna ............. F23R 3/005 60/752 |
| 2010/0095680 | A1 | 4/2010 | Rudrapatna et al. |
| 2010/0247284 | A1 | 9/2010 | Gregg et al. |
| 2011/0044805 | A1 * | 2/2011 | Koyabu .................. F01D 11/08 415/177 |
| 2011/0185739 | A1 | 8/2011 | Bronson et al. |
| 2012/0144835 | A1 * | 6/2012 | Taylor .................... F23R 3/002 60/755 |
| 2013/0019604 | A1 | 1/2013 | Cunha et al. |
| 2013/0025287 | A1 | 1/2013 | Cunha |
| 2013/0298564 | A1 * | 11/2013 | Agarwal .................. F23R 3/06 60/772 |
| 2013/0340437 | A1 | 12/2013 | Erbas-Sen et al. |
| 2014/0020393 | A1 | 1/2014 | Nakamata et al. |
| 2014/0238031 | A1 | 8/2014 | Okita et al. |
| 2015/0260399 | A1 | 9/2015 | Low |

OTHER PUBLICATIONS

Malavasi, Stefano, On the pressure losses through perforated plates, Aug. 17, 2012, Elsevier Ltd.*
Extended EP Search Report dated Jul. 26, 2016.

* cited by examiner

CONTROLLED VARIATION OF PRESSURE DROP THROUGH EFFUSION COOLING IN A DOUBLE WALLED COMBUSTOR OF A GAS TURBINE ENGINE

CROSS-REFERENCE TO RELATED APPLICATION

This application claims priority to PCT Patent Application No. PCT/US2014/055784 filed Sep. 16, 2014, which claims priority to U.S. Patent Appln. Ser. No. 61/878,327 filed Sep. 16, 2013, each of which is hereby incorporated herein by reference in its entirety.

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Advanced engine cycles require the combustor section to operate at relatively high compressor exit temperatures. A survey of typical flight envelopes often reveals that high compressor exit temperatures exist with reduced supply pressure at high altitude. These operational conditions may result in relatively high convection and radiation heat loads.

The combustor section typically includes a double wall assembly with an outer shell that is lined with heat shields, which are often referred to as floatwall liner panels, attached to the outer shell with studs and nuts. In certain arrangements, dilution holes through the double wall combustor direct cooling air for dilution of the combustion gases. In addition to the dilution holes, the outer shell typically includes numerous relatively smaller air impingement holes to direct cooling air between the floatwall panels and the outer shell of the double wall combustor to impingement cool the liner panels. This cooling air then exits effusion holes through the liner panels to form a cooling air film on a hot side of the liner panels that serves as a barrier to facilitate reduction of thermal damage.

The combustor liner panels may be subject to distress that varies both axially and circumferentially due to the complex turbulent currents of combustion products and dilution air.

SUMMARY

A combustor of a gas turbine engine, according to one disclosed non-limiting embodiment of the present disclosure, includes a support shell defining a multiple of impingement flow passages. The combustor also includes a multiple of liner panels mounted to the support shell. At least one of the multiple of liner panels defines a first impingement cavity with the support shell operable at a first pressure and a second impingement cavity operable at a second pressure different than the first pressure.

In a further embodiment of the present disclosure, one of the support shell and the multiple of liner panels includes a rail configured to segregate the first impingement cavity and the second impingement cavity.

In a further embodiment of any of the foregoing embodiments of the present disclosure, a reduced height rail is included adjacent to the support shell.

In a further embodiment of any of the foregoing embodiments of the present disclosure, the reduced height rail defines a trailing edge of the at least one of the multiple of liner panels.

In a further embodiment of any of the foregoing embodiments of the present disclosure, the support shell defines a first multiple of impingement flow passages in communication with the first impingement cavity and a second multiple of impingement flow passages in communication with the second impingement cavity.

In a further embodiment of any of the foregoing embodiments of the present disclosure, at least one of the first multiple of impingement flow passages defines a diameter different than at least one of the second multiple of impingement flow passages.

In a further embodiment of any of the foregoing embodiments of the present disclosure, each of the first multiple of impingement flow passages defines a diameter different than each of the second multiple of impingement flow passages.

In a further embodiment of any of the foregoing embodiments of the present disclosure, the first multiple of impingement flow passages are more numerous than the second multiple of impingement flow passages.

In a further embodiment of any of the foregoing embodiments of the present disclosure, a first multiple of effusion flow passages are included though the at least one of the multiple of liner panels in communication with the first impingement cavity. A second multiple of effusion flow passages are included though the at least one of the multiple of liner panels in communication with the second impingement cavity.

In a further embodiment of any of the foregoing embodiments of the present disclosure, the first multiple of impingement flow passages and the first multiple of effusion flow passages define a first ratio, and the second multiple of impingement flow passages sec and the second multiple of effusion flow passages define a second ratio, the first ratio different than the second ratio.

In a further embodiment of any of the foregoing embodiments of the present disclosure, an annular grommet is included between the support shell and the at least one of the multiple of liner panels. The annular grommet and the support shell define an annular impingement cavity.

In a further embodiment of any of the foregoing embodiments of the present disclosure, at least one effusion flow passage through the annular grommet and the at least one of the multiple of liner panels.

A combustor of a gas turbine engine, according to another disclosed non-limiting embodiment of the present disclosure, includes a support shell with a multiple of impingement flow passages. The combustor also includes a multiple of liner panels mounted to the support shell. A first liner panel of the multiple of liner panels includes a first impingement cavity with respect to the support shell that operates at a first pressure. A second liner panel with respect to the support shell of the multiple of liner panels includes a second impingement cavity that operates at a second pressure different than the first pressure.

In a further embodiment of any of the foregoing embodiments of the present disclosure, a plurality of studs are included which extend from a cold side of each of the multiple of liner panels, where the studs extend through the support shell.

In a further embodiment of any of the foregoing embodiments of the present disclosure, a first rail is included around a periphery of the first liner panel and a second rail is included around a periphery of the second liner panel. The first rail and the second rail are in contact with the support shell to segregate the first liner panel and the second liner panel.

A method of cooling a wall assembly within a combustor of a gas turbine engine, according to another disclosed non-limiting embodiment of the present disclosure, includes directing air through a support shell into a first impingement cavity and a second impingement cavity such that the first impingement cavity operates at a first pressure and the second impingement cavity operates at a second pressure different than the pressure.

In a further embodiment of any of the foregoing embodiments of the present disclosure, the method includes directing air from the second impingement cavity through a trailing edge of a liner panel mounted to the support shell.

In a further embodiment of any of the foregoing embodiments of the present disclosure, the method includes directing air from an annular impingement cavity at least partially defined by an annular grommet between the support shell and the liner panel.

In a further embodiment of any of the foregoing embodiments of the present disclosure, the method includes forming a first impingement pressure drop across the support shell in the first impingement cavity and a second impingement pressure drop across the support shell in the second impingement cavity, the first impingement pressure drop different than the second impingement pressure drop.

In a further embodiment of any of the foregoing embodiments of the present disclosure, the method includes forming a first effusion pressure drop across the liner panel with respect to the first impingement cavity and a second effusion pressure drop across the liner panel with respect to the second impingement cavity, the first effusion pressure drop different than the second effusion pressure drop.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
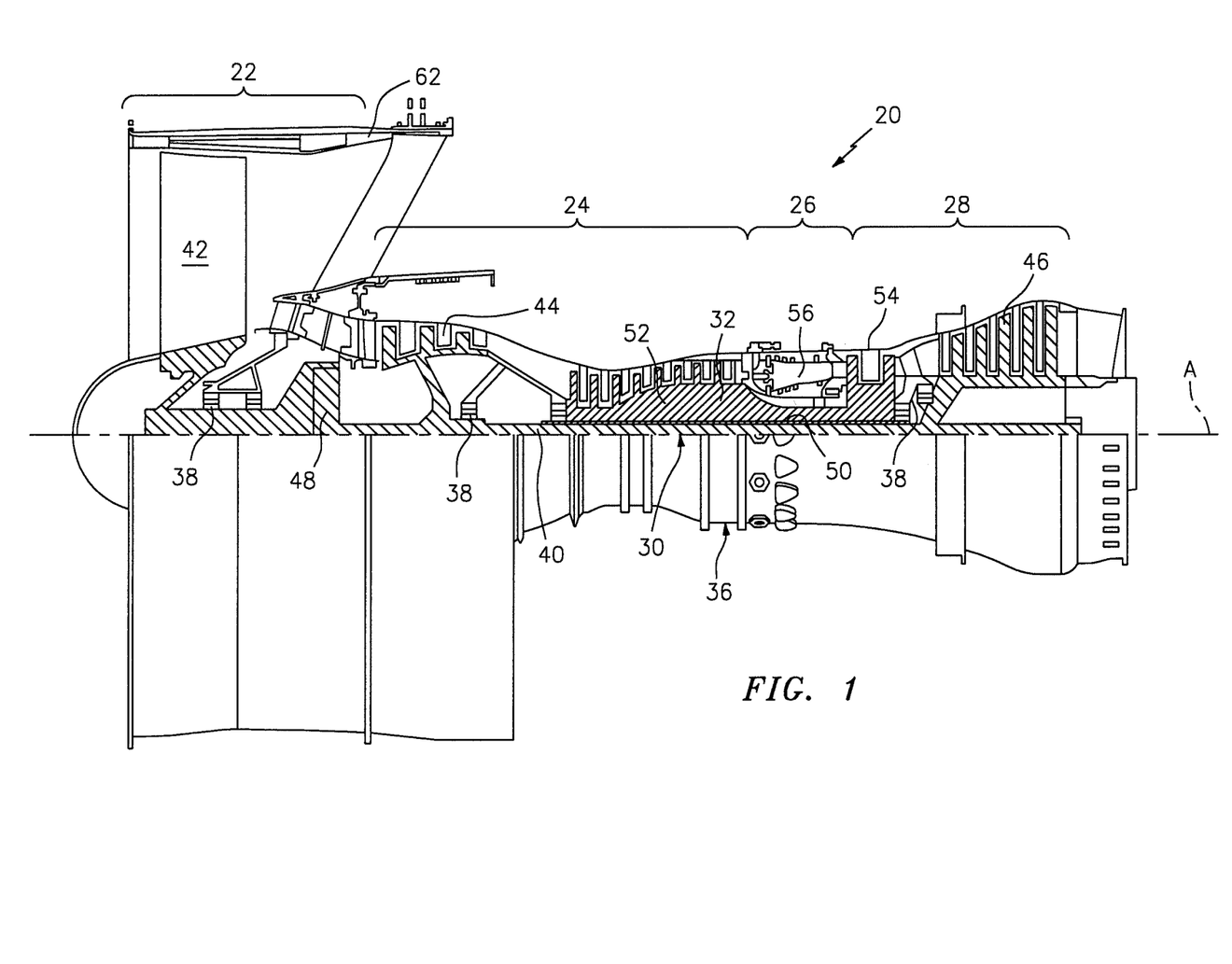
FIG. 1 is a schematic cross-section of an example gas turbine engine architecture.
Figure 2:
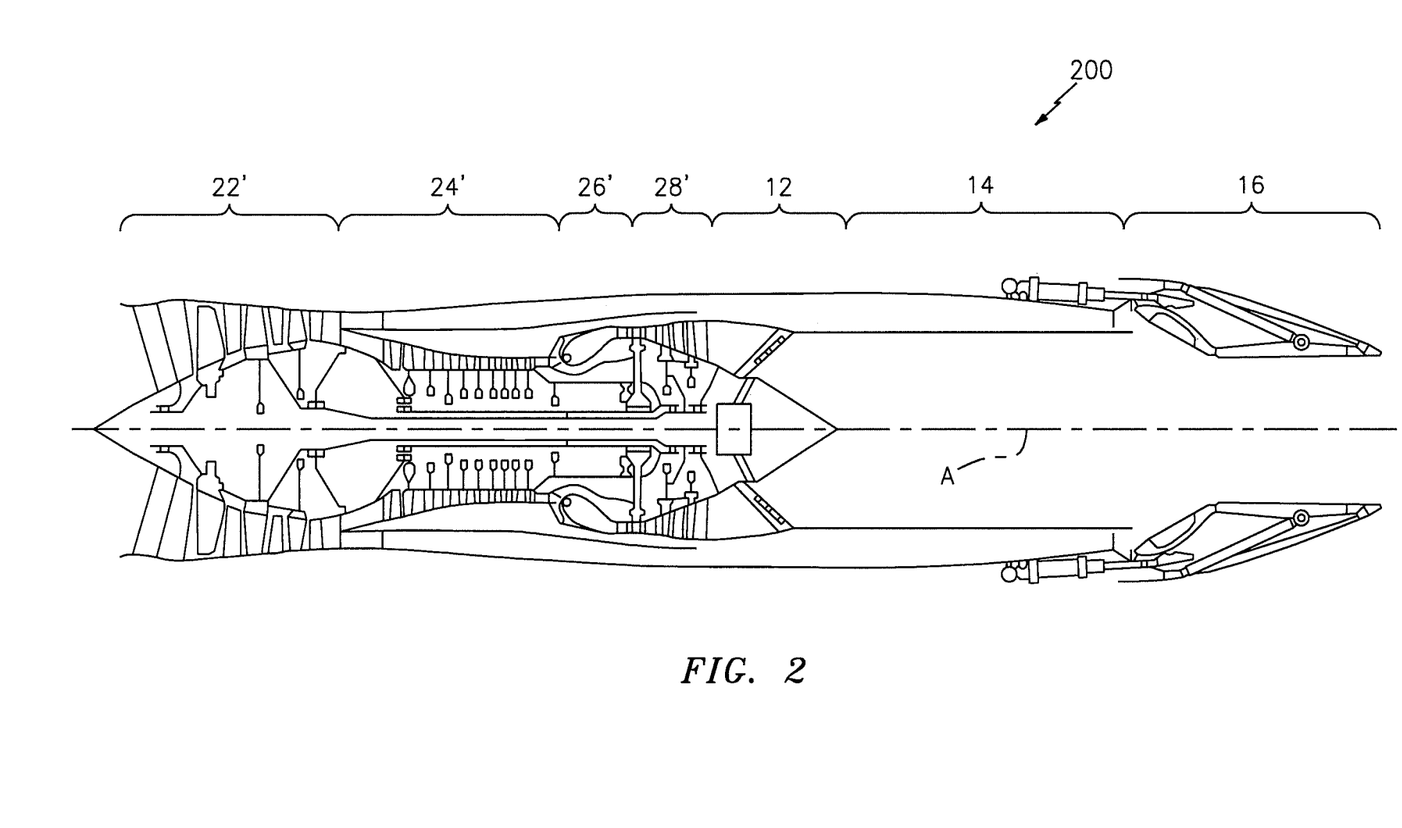
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Referring to FIG. 2, another alternative engine architecture 200 might include an augmentor section 12, an exhaust duct section 14 and a nozzle section 16 in addition to the fan section 22', compressor section 24', combustor section 26' and turbine section 28'. Although depicted as an aero engine in the disclosed non-limiting embodiments, it should be understood that the concepts described herein are not so limited and the teachings may be applied to other types of turbine engines such as a turbojets, turboshafts, and three-spool (plus fan) turbofans with an intermediate spool as well as industrial gas turbines.

Referring to FIG. 1, the fan section 22 drives air along a bypass flowpath and into the compressor section 24. The compressor section 24 drives air along a core flowpath for compression and communication into the combustor section 26, which then expands and directs the air through the turbine section 28. The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine with a bypass ratio greater than about six (6:1). The geared architecture 48 can include an epicyclic gear train, such as a planetary gear system or other gear system. The example epicyclic gear train has a gear reduction ratio of greater than about 2.3:1, and in another example, is greater than about 2.5:1. The geared turbofan enables operation of the low spool 30 at higher speeds which can increase the operational efficiency of the LPC 44 and LPT 46 to render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In another non-limiting example, the bypass ratio of the gas turbine engine 20 is greater than about ten (10:1), the fan diameter is significantly larger than that of the LPC 44, and the LPT 46 has a pressure ratio greater than about five (5:1). It should be appreciated, however, that the above parameters are only exemplary of a geared architecture engine and that the present disclosure is applicable to other gas turbine engines including direct drive turbofans.

In an example high-bypass turbofan, significant thrust is provided by the high bypass ratio as the fan section 22 may be designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC) which is an industry standard parameter of fuel consumption per unit of thrust.

Fan Pressure Ratio is the pressure ratio across a fan blade of the fan section 22 without the use of a Fan Exit Guide Vane system. The low Fan Pressure Ratio according to one example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to the example gas turbine engine 20 is less than about 1150 fps (351 m/s).

Figure 3:
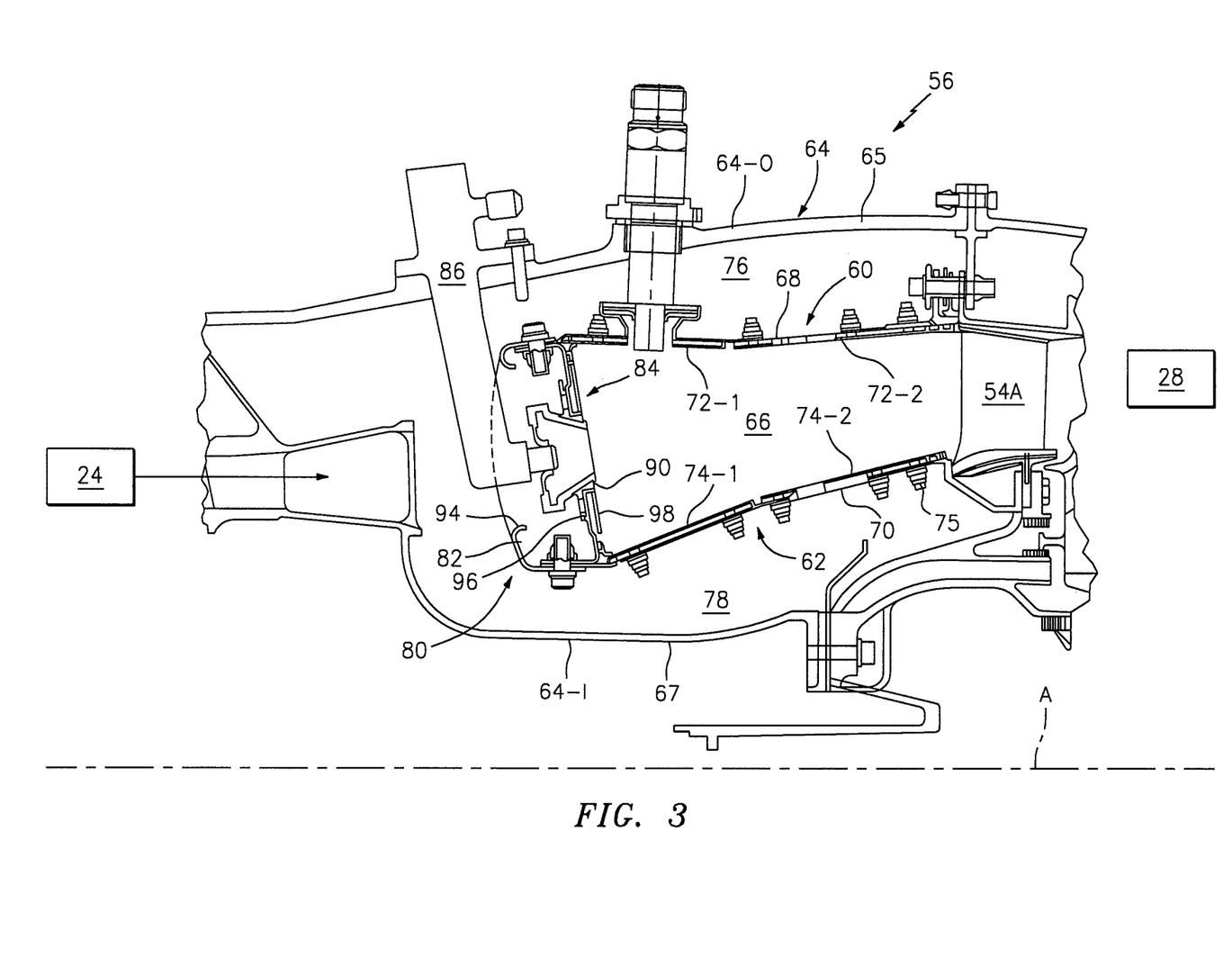
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor wall assembly 60, an inner combustor wall assembly 62 and a diffuser case module 64. The outer combustor wall assembly 60 and the inner combustor wall assembly 62 are spaced apart such that an annular combustion chamber 66 is defined therebetween.

The outer combustor wall assembly 60 is spaced radially inward from an outer diffuser case 64-O of the diffuser case module 64 to define an outer annular plenum 76. The inner combustor wall assembly 62 is spaced radially outward from an inner diffuser case 64-I of the diffuser case module 64 to define an inner annular plenum 78. It should be understood that although a particular combustor is illustrated, other combustor types with various combustor wall and diffuser case module arrangements will also benefit herefrom.

The combustor wall assemblies 60, 62 contain the combustion products for direction toward the turbine section 28. Each combustor wall assembly 60, 62 generally includes a respective support shell 68, 70 which supports one or more liner panels 72, 74 mounted within the respective support shell 68, 70. Each of the liner panels 72, 74 may be generally rectilinear with a circumferential arc and manufactured of, for example, a nickel based super alloy, ceramic or other temperature resistant material and are arranged to form a liner array. In one disclosed non-limiting embodiment, the liner array includes a multiple of forward liner panels 72-1 and a multiple of aft liner panels 72-2 that are circumferentially staggered to line the outer shell 68. A multiple of forward liner panels 74-1 and a multiple of aft liner panels 74-2 are circumferentially staggered to line the inner shell 70.

The combustor 56 further includes a forward assembly 80 immediately downstream of the compressor section 24 to receive compressed airflow therefrom. The forward assembly 80 generally includes an annular hood 82 and a bulkhead assembly 84 that support a multiple of fuel nozzles 86 (one shown) and a multiple of swirlers 90 (one shown). The annular hood 82 extends radially between, and is secured to, the forwardmost ends of the combustor wall assemblies 60, 62. The annular hood 82 includes a multiple of circumferentially distributed hood ports 94 each of which accommodates the respective fuel nozzle 86 and introduce air into the forward end of the combustion chamber 66 through a respective swirler 90. The bulkhead assembly 84 includes a bulkhead support shell 96 secured to the combustor wall assemblies 60, 62, and a multiple of circumferentially distributed bulkhead liner panels 98 secured to the bulkhead support shell 96. Each fuel nozzle 86 may be secured to the diffuser case module 64 and project through one of the hood ports 94 and respective swirlers 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto turbine blades in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation.

Figure 4:
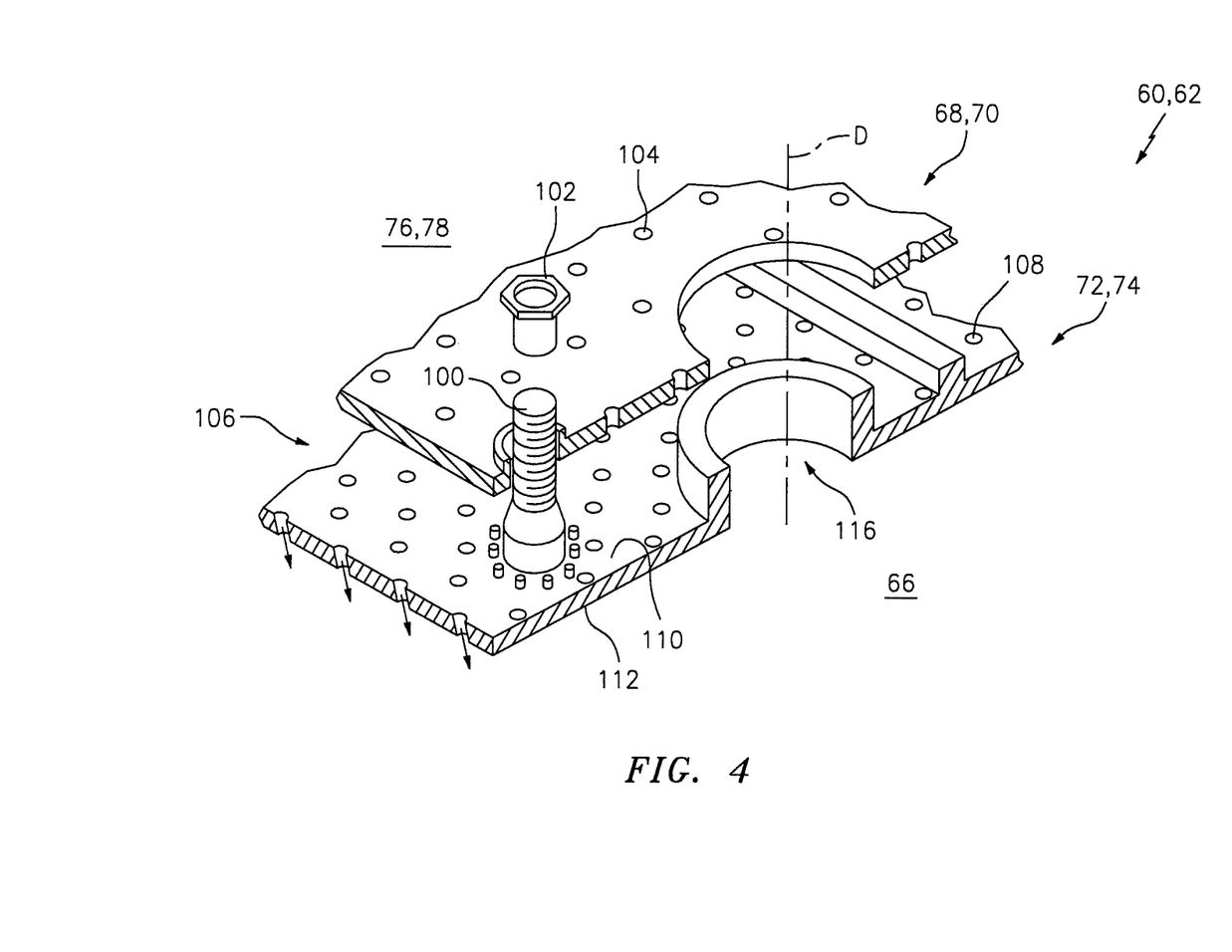
FIG. 4 is an expanded exploded view of a combustor wall assembly.
Figure 5:
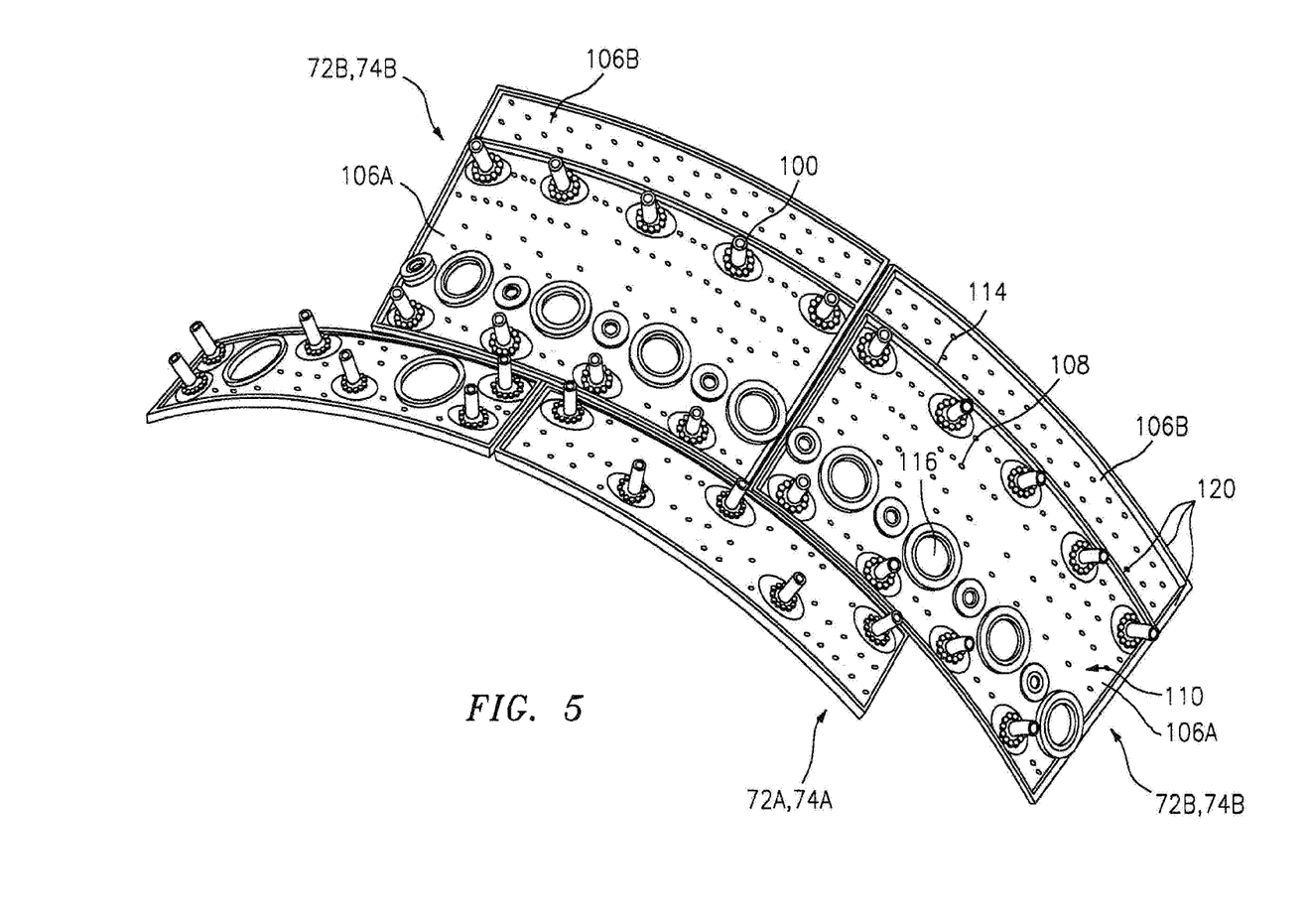
FIG. 5 is a perspective cold side view of a portion of an outer liner panel array.

With reference to FIG. 4, a multiple of studs 100 extend from the liner panels 72, 74 so as to permit the liner panels 72, 74 to be mounted to their respective support shells 68, 70 with fasteners 102 such as nuts. That is, the studs 100 project rigidly from the liner panels 72, 74 through the respective support shells 68, 70 to receive the fasteners 102 at a threaded distal end section thereof to define one or more impingement cavities 106. The liner panels 72, 74 typically include one or more rails 120 (see FIG. 5) which extend from a cold side 110 thereof. The rail 120 typically extends at least around the periphery of the cold side 110 (FIG. 5) to interface with their respective support shells 68, 70 when mounted thereto to define one or more impingement cavities 106. That is, the rails 120 at least extend around the cold side 110 periphery and may include further internal rails to define additional compartments.

A multiple of cooling impingement passages 104 penetrate through the support shells 68, 70 to allow air from the respective annular plenums 76, 78 to enter impingement cavities 106 formed within the combustor wall assemblies 60, 62 between the respective support shells 68, 70 and liner panels 72, 74. The cooling impingement passages 104 are generally normal to the surface of the liner panels 72, 74. The air in the impingement cavities 106 provides cold side impingement cooling of the liner panels 72, 74 that is generally defined herein as heat removal via internal convection.

A multiple of effusion passages 108 penetrate through each of the liner panels 72, 74. The geometry of the passages (e.g., diameter, shape, density, surface angle, incidence angle, etc.) as well as the location of the passages with respect to the high temperature combustion gas flow within the combustion chamber 66 also contributes to effusion film cooling. The combination of impingement passages 104 and effusion passages 108 for a double wall architecture may be referred to as an Impingement Film Floatwall (IFF) assembly.

The effusion passages 108 allow air to pass from each impingement cavity 106 defined in part by the cold side 110 of the liner panels 72, 74 to a hot side 112 thereof to facilitate the formation of a relatively thin, insulating blanket of cooling air along the hot side 112. The effusion passages 108 are generally more numerous than the impingement passages 104 to promote the development of a sheath of film cooling along the hot side 112. Film cooling as defined herein is the introduction of a relatively cooler air at one or more discrete locations along a surface exposed to a high temperature environment to protect that surface in the region of the air injection as well as downstream thereof.

Each of the multiple of dilution passages 116 may also penetrate through the respective support shells 68, 70 and liner panels 72, 74 along a common axis D. For example only, in a Rich-Quench-Lean (R-Q-L) type combustor, the dilution passages 116 are axially located to dilute the hot combustion gases within the combustion chamber 66 by direct supply of cooling air from the respective annular plenums 76, 78.

Figure 6:
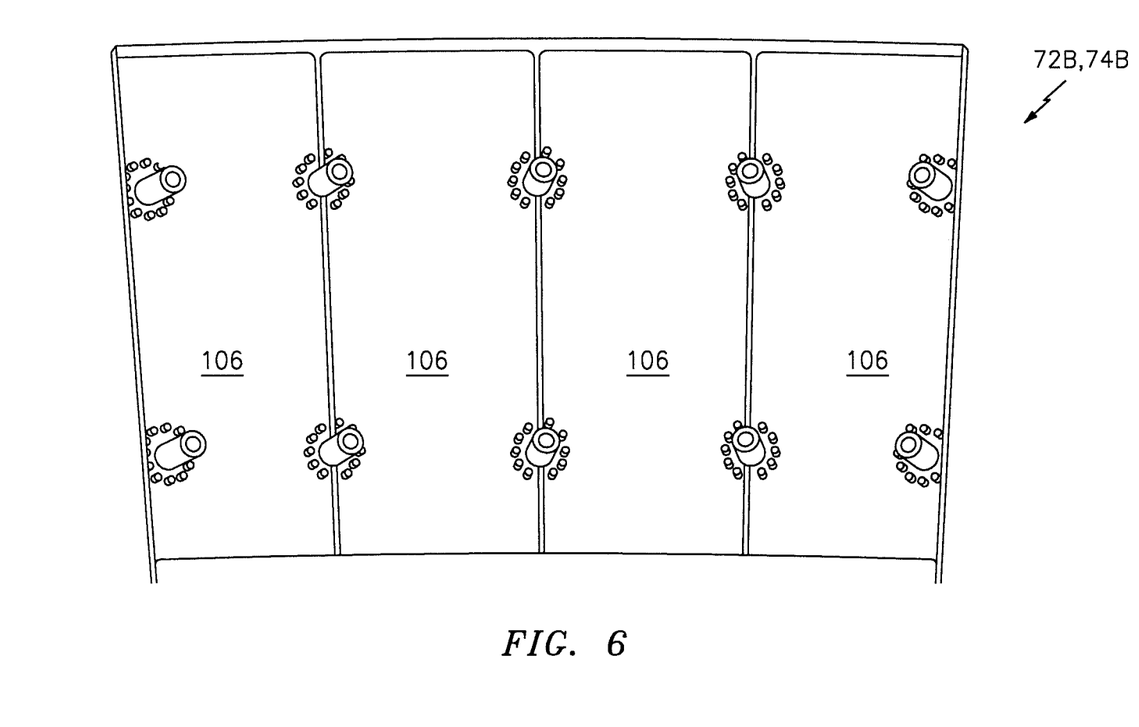
FIG. 6 is a perspective cold side view of one liner panel according to another disclosed non-limiting embodiment.
Figure 7:
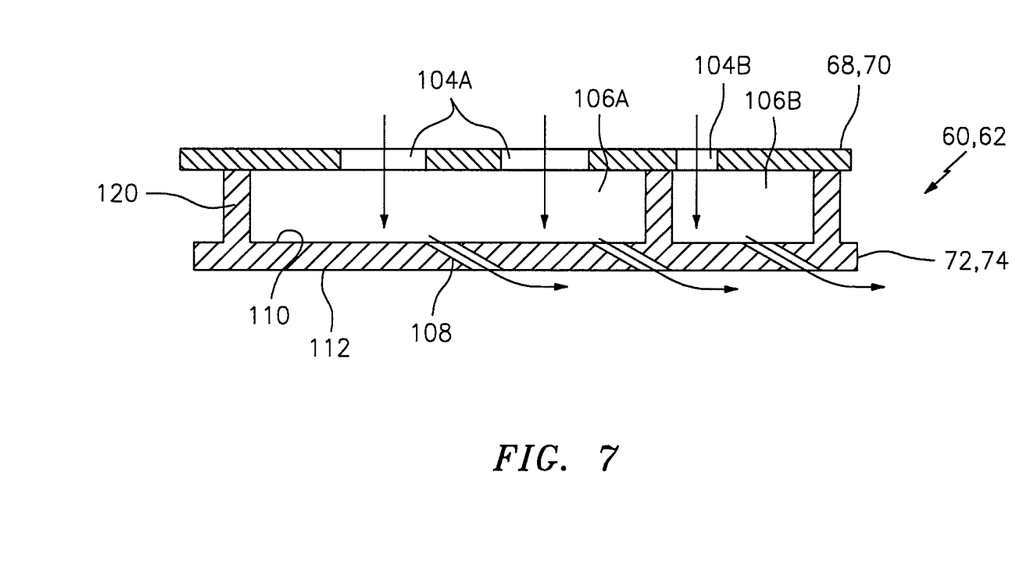
FIG. 7 is a sectional view of a combustor wall assembly according to one disclosed non-limiting embodiment.

With reference to FIG. 7, in one disclosed non-limiting embodiment, the multiple rails 120 define two (2) impingement cavities 106A, 106B in this example liner panel 72. It should be appreciated that although two (2) impingement cavities 106A, 106B are illustrated for descriptive purposes in one outer liner panel 72, any number and arrangement of impingement cavities 106 (four shown in FIG. 6) will benefit herefrom as well as the inner liner panel 74. It should be appreciated that, although only an example outer liner panel 72 is illustrated in the disclosed non-limiting embodiment, the inner liner panels 74 will also benefit herefrom.

As further discussed below, each impingement cavity 106A, 106B is configured to operate at a different pressure, and thereby defines different controlled pressure drops. That is, impingement cavity 106A operates at a first pressure while impingement cavity 106B operates at a second pressure different than the first pressure. Such differential pressure within a single liner panel 72, 74 facilitates, for example, tailored cooling effects for different circumferential and/or axial conditions within the combustion chamber 66.

The pressure drop across the combustor 56 may be defined as an impingement pressure drop across the support shell 68, 70 and an effusion pressure drop across the liner panels 72, 74 for each impingement cavity 106A, 106B. For example, the impingement cavity 106A may define an about 80% impingement pressure drop for impingement flow and about 20% for effusion flow while impingement cavity 106B may provide a 70%-30% split. It should be appreciated that various pressure drop splits may be defined for each impingement cavity 106A, 106B.

With continued reference to FIG. 7, according to one disclosed non-limiting embodiment, the differential pressure within the impingement cavities 106A, 106B is provided by multiple impingement passages 104 of different diameters for each respective impingement cavity 106A, 106B. For example, each impingement passage 104A which communicates with impingement cavity 106A defines a first diameter while each impingement passage 104B which communicates with impingement cavity 106B defines a second diameter different than the first diameter. In this disclosed non-limiting embodiment, the impingement passages 104A, 104B are laser drilled and thereby readily manufactured and associated with the specific impingement cavity 106A, 106B.

Figure 8:
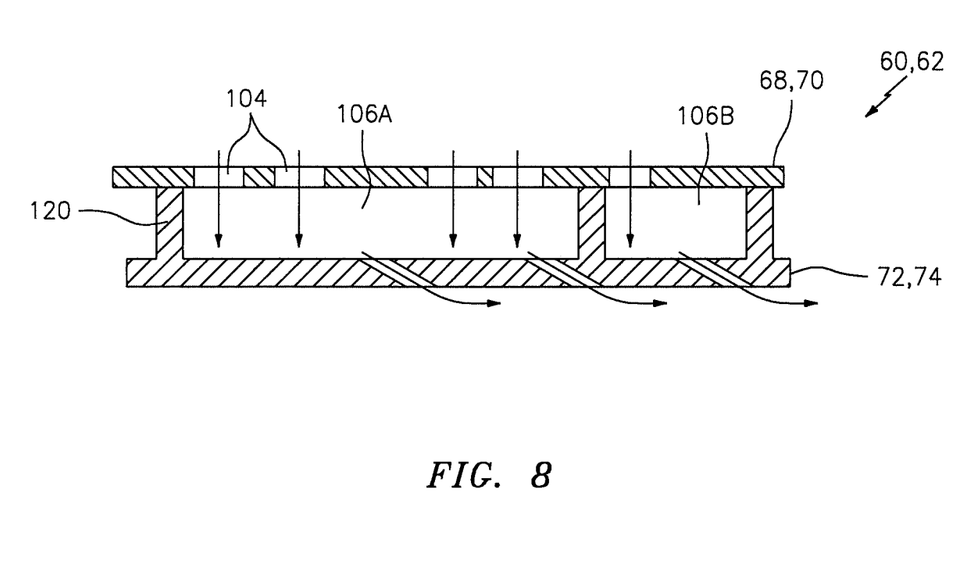
FIG. 8 is a sectional view of a combustor wall assembly according to another disclosed non-limiting embodiment.

With reference to FIG. 8, according to another disclosed non-limiting embodiment, the differential pressure within the impingement cavities 106A, 106B is obtained by differing ratios of impingement passages 104 (which may or may not be of the same diameter) to effusion passages 108 for the respective impingement cavity 106A, 106B to provide the desired differential pressures within the respective impingement cavities 106A, 106B.

Figure 9:
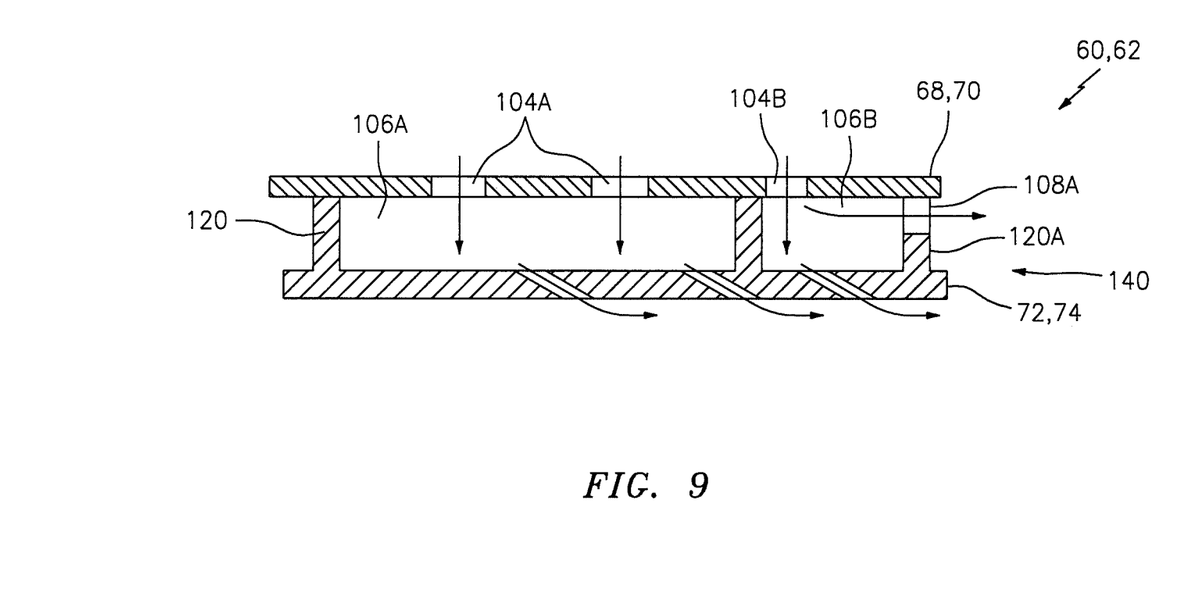
FIG. 9 is a sectional view of a combustor wall assembly according to another disclosed non-limiting embodiment.
Figure 10:
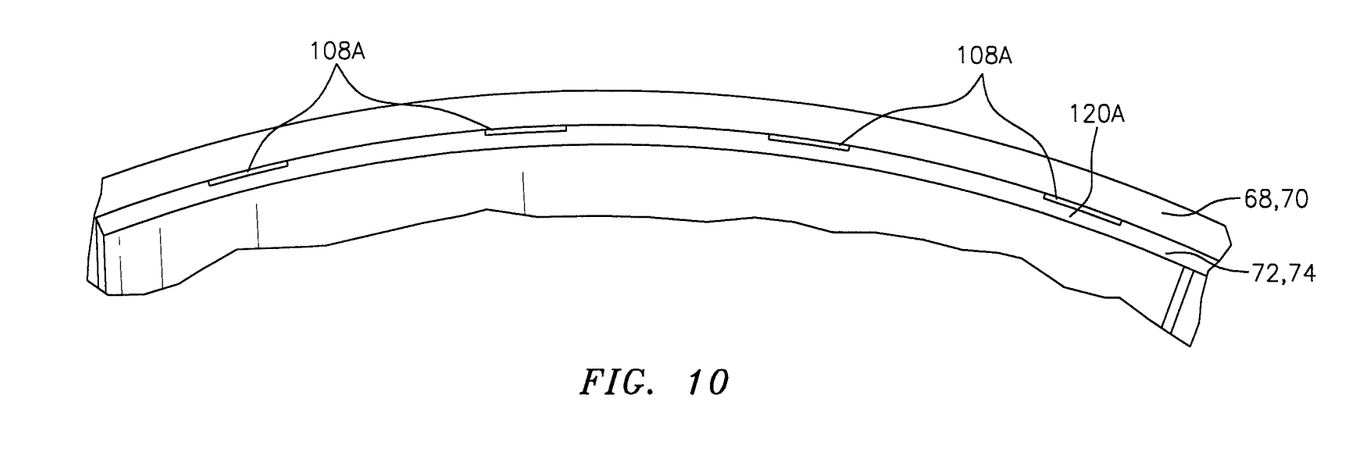
FIG. 10 is a trailing edge view of the combustor wall assembly of FIG. 9.

With reference to FIG. 9, according to another disclosed non-limiting embodiment, the differential pressure within the impingement cavities 106A, 106B is provided by a reduced height rail 120A. The reduced height rail 120A does not contact the respective support shell 68 and forms an effusion slot 108A between the liner panel 72 and support shell 68 at a trailing edge 140 of each or either of the wall assemblies 60, 62 (FIG. 10). The effusion slot 140 is open to the impingement cavity 106B, and thereby varies the pressure drop thereof as the slot 140 operates as an additional effusion passage. It should be appreciated that the reduced height rail 120A may extend circumferentially for only discrete lengths to define circumferential slots 108A (FIG. 10).

Figure 11:
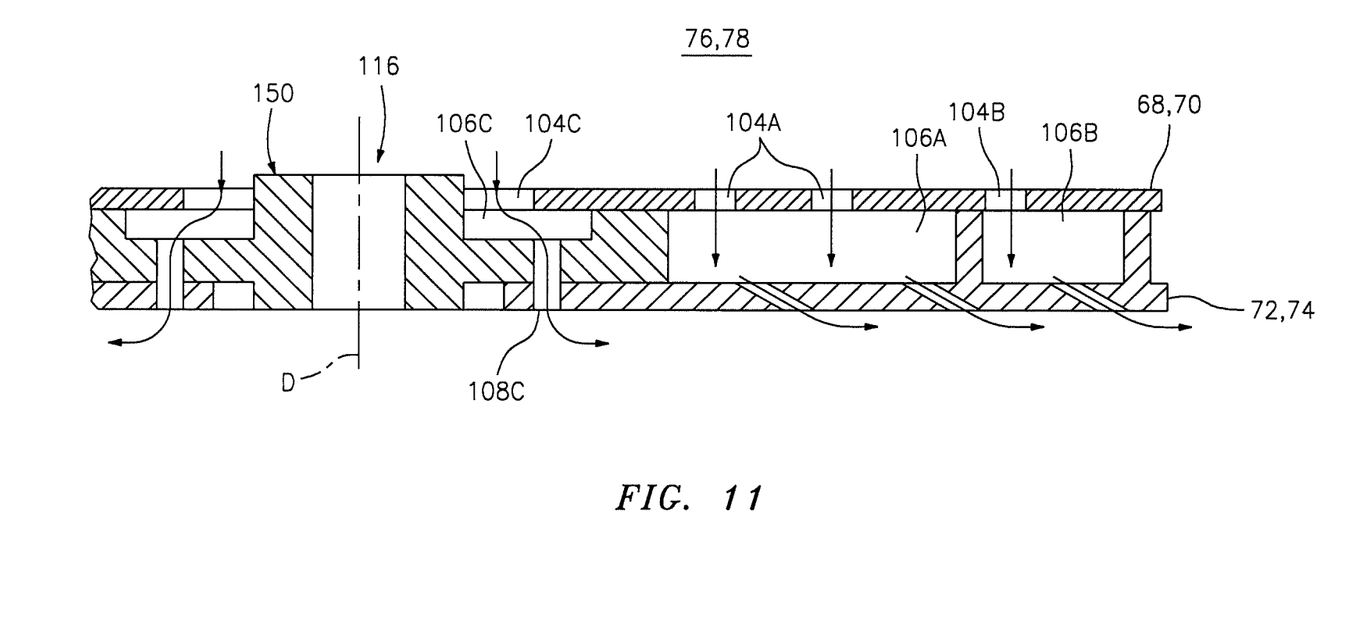
FIG. 11 is a sectional view of a combustor wall assembly according to another disclosed non-limiting embodiment.

With reference to FIG. 11, according to another disclosed non-limiting embodiment, an annular impingement cavity 106C may additionally be formed by an annular grommet 150 mounted between the respective support shell 68, 70 and associated liner panels 72, 74. The annular grommet 150 permits the respective support shell 68, 70 and associated liner panels 72, 74 to be manufactured as generally consistent flat panels as the annular grommet 150 separately defines the dilution passage 116. In this disclosed non-limiting embodiment, the impingement cavity 106C is generally annular and defined between the annular grommet 150 and the respective support shell 68, 70. That is, the interface geometry between the annular grommet 150 and the respective support shell 68, 70 defines a generally annular impingement passage 104C. The annular grommet 150 abuts the respective liner panel 72, 74 and includes one or more effusion passages 108C therethrough. The effusion passages 108C facilitate a relatively high pressure drop as the annular impingement cavity 106C is open to the respective annular plenum 76, 78. It should be appreciated that other geometries may be provided to facilitate formation of the differential pressures and desired controlled pressure drops.

Controlled pressure drop across the supports shells and respective liner panels facilitates tailored cooling effectiveness for the different boundary conditions of the liner panel hot face. For example, increased pressure drop through the effusion holes provides a greater lifting effect on the hot combustion gases to enhance durability of the liner panels where impinging combustion products pose a potential risk of backflow while reduced pressure drop through the effusion holes is desirable to provide a relatively low velocity flow that remains attached to the hot side of the liner panel.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A combustor of a gas turbine engine, comprising:
   a support shell;
   a multiple of liner panels mounted to the support shell;
   a rail extending between the support shell and at least one of the multiple of liner panels, the support shell and the at least one of the multiple of liner panels defining a first impingement cavity on a first side of the rail and a second impingement cavity on a second side of the rail opposite the first side;
   an annular grommet disposed between the support shell and the at least one of the multiple of liner panels, the annular grommet and the support shell defining an annular impingement cavity therebetween, the annular grommet comprising a first grommet portion defining a dilution hole therethrough, a second grommet portion radially outside the first grommet portion with respect to a dilution hole common axis of the dilution hole, and a third grommet portion radially outside the second grommet portion with respect to the dilution hole common axis and in contact with the support shell and the at least one of the multiple of liner panels;
   an annular impingement passage defined between the support shell and a perimeter of the first grommet portion; and
   a plurality of effusion flow passages extending through the second grommet portion and the at least one of the multiple of liner panels between the annular impingement cavity and a hot side of the at least one of the multiple of liner panels,
   wherein the support shell defines a first multiple of impingement flow passages in communication with the first impingement cavity and a second multiple of impingement flow passages in communication with the second impingement cavity.

2. The combustor as recited in claim 1, wherein the rail is configured to segregate the first impingement cavity and the second impingement cavity.

3. The combustor as recited in claim 2, further comprising a reduced height rail extending from the at least one of the multiple of liner panels toward the support shell, a portion of a distance between the at least one of the multiple of liner panels and the support shell.

4. The combustor as recited in claim 3, wherein the reduced height rail defines a trailing edge of the at least one of the multiple of liner panels.

5. The combustor as recited in claim 1, wherein the first multiple of impingement flow passages are more numerous than the second multiple of impingement flow passages.

6. The combustor as recited in claim 1, further comprising
   a first multiple of effusion flow passages though the at least one of the multiple of liner panels in communication with the first impingement cavity; and
   a second multiple of effusion flow passages though the at least one of the multiple of liner panels in communication with the second impingement cavity.

7. The combustor as recited in claim 6, wherein
   a number of the first multiple of impingement flow passages and a number of the first multiple of effusion flow passages define a first ratio and a number of the second multiple of impingement flow passages and a number of the second multiple of effusion flow passages define a second ratio, the first ratio different than the second ratio.

8. The combustor of claim 1, wherein the plurality of effusion flow passages are radially outside of the annular impingement passage with respect to the dilution hole common axis.

9. The combustor of claim 8, wherein the second grommet portion comprises a first grommet side and an opposing second grommet side each extending between the first grommet portion and the second grommet portion, the first grommet side defining a portion of the annular impingement cavity and the second grommet side contacting the at least one of the multiple of liner panels.

10. A combustor of a gas turbine engine, comprising:
    a support shell;
    a multiple of liner panels mounted to the support shell, the multiple of liner panels including at least a first liner panel and a second liner panel; and
    at least one rail extending around at least a periphery of each of the first liner panel and the second liner panel, the at least one rail extending between the support shell and each of the first liner panel and the second liner panel, wherein the at least one rail defines a first impingement cavity between the first liner panel and the support shell and a second impingement cavity between the second liner panel and the support;
    an annular grommet disposed between the support shell and at least one of the multiple of liner panels, the annular grommet and the support shell defining an annular impingement cavity therebetween, the annular grommet comprising a first grommet portion defining a dilution hole therethrough, a second grommet portion radially outside the first grommet portion with respect to a dilution hole common axis of the dilution hole, and a third grommet portion radially outside the second grommet portion with respect to the dilution hole common axis and in contact with the support shell and the at least one of the multiple of liner panels;
    an annular impingement passage defined between the support shell and a perimeter of the first grommet portion; and
    a plurality of effusion flow passages extending through the second grommet portion and the at least one of the multiple of liner panels between the annular impingement cavity and a hot side of the at least one of the multiple of liner panels, wherein the support shell defines a first multiple of impingement flow passages in communication with the first impingement cavity and a second multiple of impingement flow passages in communication with the second impingement cavity, and wherein each impingement flow passage of the first multiple of impingement flow passages defines a first diameter and each impingement flow passage of the second multiple of impingement flow passages defines a second diameter different than the first diameter.

11. The combustor as recited in claim 10, further comprising a plurality of studs which extend from a cold side of each of the multiple of liner panels, the studs extending through the support shell.

12. A method of cooling a wall assembly within a combustor of a gas turbine engine, comprising:

directing a first air flow through a support shell into a first impingement cavity via first impingement passages having a first diameter, the first impingement cavity defined between the support shell and a liner panel mounted to the support shell on a first side of a rail extending between the support shell and the liner panel;

directing a second air flow through the support shell into a second impingement cavity via second impingement passages having a second diameter greater than the first diameter, the second impingement cavity defined between the support shell and the liner panel on a second side of the rail opposite the first side;

directing a third air flow into an annular impingement cavity defined by the support shell and an annular grommet disposed between the support shell and the liner panel via an annular impingement passage, the annular grommet comprising a first grommet portion defining a dilution hole therethrough, a second grommet portion radially outside the first grommet portion with respect to a dilution hole common axis of the dilution hole, and a third grommet portion radially outside the second grommet portion with respect to the dilution hole common axis and in contact with the support shell and the liner panel, the annular impingement passage defined between the support shell and a perimeter of the first grommet portion; and directing the first air flow out of the first impingement cavity through the liner panel via first effusion passages, directing the second air flow out of the second impingement cavity through the liner panel via second effusion passages, and directing the third air flow out of the annular impingement cavity via third effusion passages extending through the second grommet portion and the liner panel between the annular impingement cavity and a hot side of the liner panel.

13. The method as recited in claim 12, wherein the second effusion passages are disposed through a trailing edge of the liner panel.

14. The method as recited in claim 12, further comprising forming a first impingement pressure drop across the support shell in the first impingement cavity and a second impingement pressure drop across the support shell in the second impingement cavity, the first impingement pressure drop different than the second impingement pressure drop.

15. The method as recited in claim 12, further comprising forming a first effusion pressure drop across the liner panel with respect to the first impingement cavity and a second effusion pressure drop across the liner panel with respect to the second impingement cavity, the first effusion pressure drop different than the second effusion pressure drop.

* * * * *